United States Patent
Chen et al.

(10) Patent No.: US 7,683,976 B2
(45) Date of Patent: Mar. 23, 2010

(54) LIQUID CRYSTAL DISPLAY PANEL AND LIQUID CRYSTAL DISPLAY APPLYING THE SAME

(75) Inventors: Ying-Ru Chen, Hsinchu (TW); Hsiang-Lin Lin, Hsinchu (TW); Ching-Huan Lin, Hsinchu (TW); Chih-Ming Chang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 215 days.

(21) Appl. No.: 12/043,967

(22) Filed: Mar. 7, 2008

(65) Prior Publication Data

US 2009/0109386 A1   Apr. 30, 2009

(30) Foreign Application Priority Data

Oct. 26, 2007   (TW) .............................. 96140295 A (51) Int. Cl.
 *G02F 1/1343*   (2006.01)
(52) U.S. Cl. ........................... 349/39; 349/139; 349/129
(58) Field of Classification Search ........................ None
 See application file for complete search history.

(56) References Cited

U.S. PATENT DOCUMENTS

| | | | |
|---|---|---|---|
| 5,446,562 A | 8/1995 | Sato | |
| 5,459,596 A | 10/1995 | Ueda et al. | |
| 5,835,169 A | 11/1998 | Kwon et al. | |
| 6,646,707 B2 * | 11/2003 | Noh et al. | ..................... 349/141 |
| 6,833,897 B2 * | 12/2004 | Lee et al. | ..................... 349/141 |
| 6,977,704 B2 | 12/2005 | Kataoka | |
| 7,113,241 B2 | 9/2006 | Hanaoka | |
| 7,477,336 B2 * | 1/2009 | Noda et al. | ..................... 349/43 |

FOREIGN PATENT DOCUMENTS

| | | |
|---|---|---|
| CN | 1252532 | 5/2000 |
| CN | 1959511 | 5/2007 |
| CN | 101017290 | 8/2007 |
| TW | I238277 | 8/2005 |

* cited by examiner

*Primary Examiner*—Richard H Kim
(74) *Attorney, Agent, or Firm*—Jianq Chyun IP Office (57) ABSTRACT

A liquid crystal display panel is provided. The liquid crystal display panel includes an active device array substrate, an opposite substrate, a plurality of scan lines, a plurality of data patterns, a plurality of connecting patterns, a plurality of active devices, a plurality of transparent pixel electrodes, a plurality of common lines, at least one polymer layer, and a liquid crystal layer. The opposite substrate is disposed above the active device array substrate. The scan lines, the data patterns and the connecting patterns are disposed on the active device array substrate, and the data patterns and the connecting patterns form data lines via contact holes. The common lines are disposed between the transparent pixel electrodes and the data lines, and a part of each common line overlaps the corresponding data pattern. The polymer layer is disposed on at least one of the active device array substrate and the opposite substrate.

20 Claims, 8 Drawing Sheets

LIQUID CRYSTAL DISPLAY PANEL AND LIQUID CRYSTAL DISPLAY APPLYING THE SAME

CROSS-REFERENCE TO RELATED APPLICATION

This application claims the priority benefit of Taiwan application serial no. 96140295, filed on Oct. 26, 2007. The entirety the above-mentioned patent application is hereby incorporated by reference herein and made a part of specification.

BACKGROUND OF THE INVENTION

1. Field of the Invention

The present invention relates to a liquid crystal display panel. More particularly, the present invention relates to a liquid crystal display panel using polymer-stabilized alignment and a liquid crystal display applying the same.

2. Description of Related Art

With the rapid progress of the performance of computers and the development of Internet and multimedia technology, video or image devices are becoming lighter and smaller. As for the displays, along with the advancement of optoelectronic technology and semiconductor manufacturing technology, liquid crystal displays with high definition, high space utilization efficiency, low power consumption, and no radiation are gradually becoming dominant products in the market.

A liquid crystal display includes a backlight module and a liquid crystal display panel, and a conventional liquid crystal display panel is composed by two substrates and a liquid crystal layer between the two substrates. Generally speaking, when the liquid crystal panel is manufactured, alignment films will be formed on the two substrates, such that liquid crystal molecules are aligned in a specific manner. A conventional method of forming the alignment films is coating an alignment material first, and then performing an alignment process on the alignment material. The alignment process can be classified into a contact alignment process and a non-contact alignment process. Though the non-contact alignment process solves the problems of electrostatics and particle contamination in the contact friction alignment, it often leads to the problem of insufficient anchoring energy on alignment surfaces. When the anchoring energy on the alignment surfaces is insufficient, the display quality of the liquid crystal display will be degraded.

In order to solve the above problems, a polymer stabilized alignment (PSA) technology has been developed. According to this technology, high molecular monomers of an appropriate concentration are doped into the liquid crystal material and are vibrated to an even state. Next, the mixed liquid crystal material is heated to an isotropy state on a heater. Then, when the liquid crystal mixture is cooled to the ambient temperature of 25° C., the liquid crystal mixture returns to a nematic state. At this time, the liquid crystal mixture is injected into the liquid crystal cell, and a voltage is applied thereon. When the arrangement of the liquid crystal molecules is stabilized, the high molecular monomers are bonded to form a polymer layer by means of UV curing or heating, so as to realize the stabilized alignment.

Figure 1:
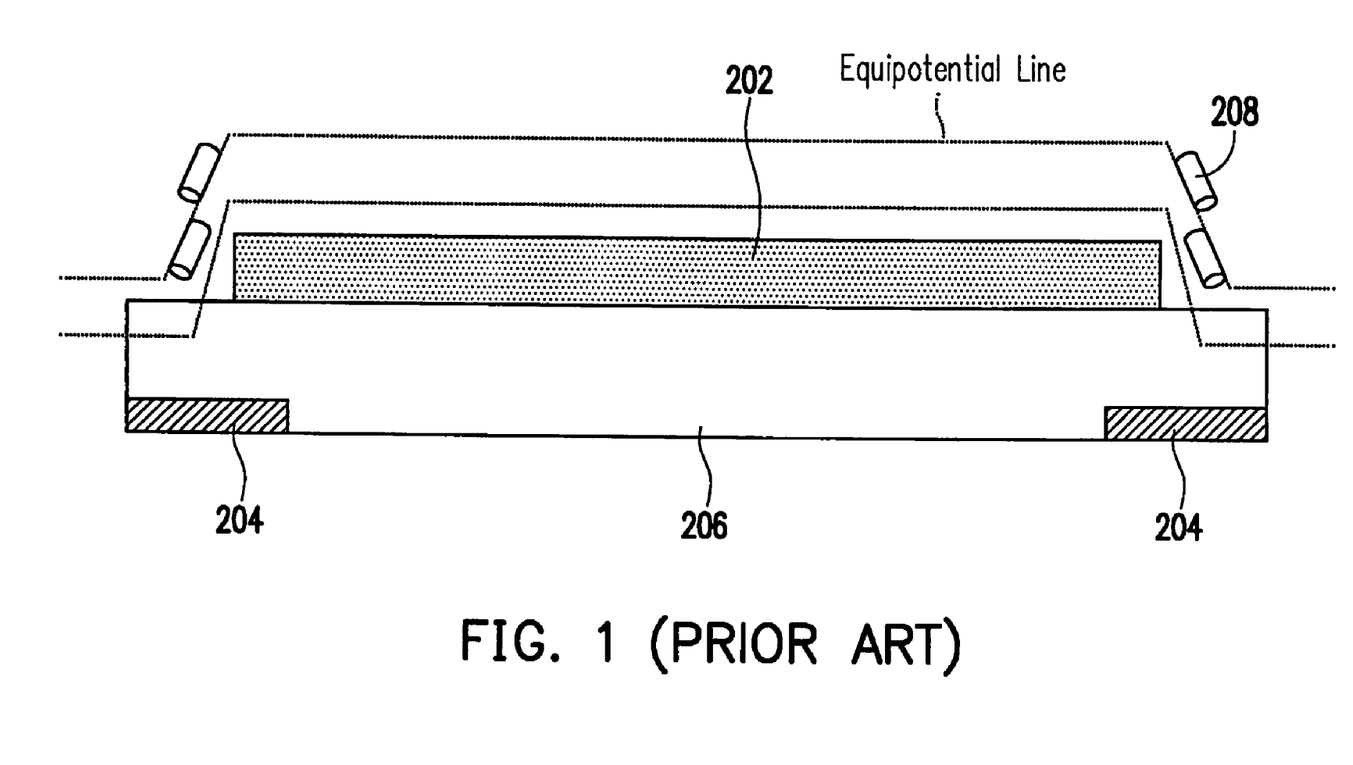
FIG. 1 is a sectional view of a conventional liquid crystal display panel.

Conventionally, the voltage is applied on the pixel electrodes by coupling with the pixel electrodes, or through the thin film transistor. As for the first method of applying the voltage, the line layout is simple, but a high voltage must be provided, and the actual voltage difference on the liquid crystal is difficult to control. As for the second method, a certain voltage difference on the liquid crystal can be obtained, and the liquid crystal arrangement is fine. However, referring to FIG. 1, when the voltage is applied with the thin film transistors, liquid, crystal molecules 208 on edges of a pixel electrode 202 are often interfered by the electromagnetic coupling effect of neighboring data lines 204, and will be arranged less regularly. Therefore, the problems of mura or light leakage will occur on liquid crystal panels.

SUMMARY OF THE INVENTION

The present invention is directed to a liquid crystal display panel, which solves the problem of irregular arrangement of liquid crystal caused by interference of an electromagnetic coupling effect of neighboring data lines in a PSA process.

The present invention is further directed to a liquid crystal display applying the aforementioned liquid crystal display panel to provide superior display quality.

As embodied and broadly described herein, a liquid crystal display panel is provided. The liquid crystal display panel includes an active device array substrate, an opposite substrate, a plurality of scan lines, a plurality of data patterns, a plurality of connecting patterns, a plurality of active devices, a plurality of transparent pixel electrodes, a plurality of common lines, at least one polymer layer, and a liquid crystal layer. The opposite substrate is disposed above the active device array substrate. The scan lines are disposed on the active device array substrate. The data patterns are disposed on the active device array substrate. The connecting patterns are disposed on the active device array substrate, and form a plurality of data lines with the data patterns via a plurality of contact holes. Each of the active devices is electrically connected to one of the scan lines and one of the data lines. Each of the transparent pixel electrodes is electrically connected to one of the active devices, and has a plurality of first slits. The common lines are disposed between the transparent pixel electrodes and the data lines, and a part of each common line overlaps the corresponding data pattern. The polymer layer is disposed on at least one of the active device array substrate and the opposite substrate. The liquid crystal layer is disposed between the active device array substrate and the opposite substrate and has a plurality of liquid crystal molecules. An arrangement direction of the liquid crystal molecules is substantially parallel to the first slits.

In one embodiment of the present invention, the liquid crystal display panel further includes a protective layer disposed between the common lines and the transparent pixel electrodes.

In one embodiment of the present invention, the liquid crystal display panel further includes at least one alignment layer disposed between the surface of the active device array substrate and the polymer layer and/or between the surface of the opposite substrate and the polymer layer.

In one embodiment of the present invention, a material of the polymer layer includes high molecular monomers, and the high molecular monomers are photopolymerized or thermally polymerized.

In one embodiment of the present invention, the first slits have different extending directions.

In one embodiment of the present invention, the arrangement direction of the liquid crystal molecules is substantially parallel to the first slits.

In one embodiment of the present invention, the liquid crystal display panel further includes a plurality of reflective pixel electrodes, and each of the reflective pixel electrodes is electrically connected to one of the active devices.

In one embodiment of the present invention, each reflective pixel electrode has a plurality of second slits.

In one embodiment of the present invention, the second slits have different extending directions.

In one embodiment of the present invention, the opposite substrate includes a plurality of alignment protrusions disposed above the reflective pixel electrodes.

In one embodiment of the present invention, the reflective pixel electrodes and the transparent pixel electrodes are corresponding to different cell gaps.

The present invention further provides a liquid crystal display using the liquid crystal display panel. The liquid crystal display includes a backlight module and the liquid crystal display panel. The liquid crystal display panel is disposed above the backlight module, and uses a light source provided by the backlight module as a display light source.

The liquid crystal display panel and the liquid crystal display of the present invention have the structure in which a part of each common line overlaps the data patterns of the data lines. Therefore, when a PSA process is performed to apply a voltage on the liquid crystal molecules, the common lines can shield the liquid crystal molecules from the interference of an electrical field of the data lines. Thus, better liquid crystal arrangement is achieved, and the response time, contrast and display quality of the liquid crystal display can be improved.

In order to make the aforementioned features and advantages of the present invention comprehensible, embodiments accompanied with the drawings are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 2:
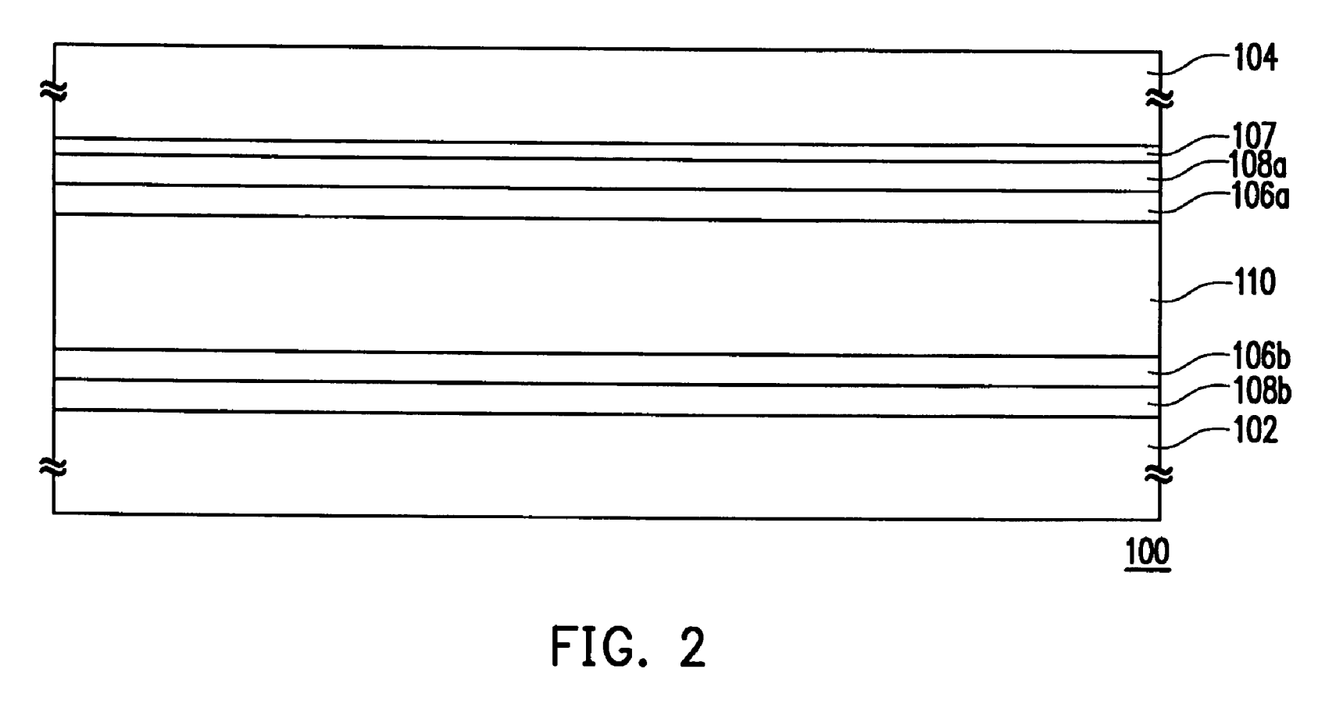
FIG. 2 is a sectional view of a liquid crystal display panel according to an embodiment of the present invention.

FIG. 2 is a sectional view of a liquid crystal display panel according to an embodiment of the present invention.

Referring to FIG. 2, the liquid crystal display panel 100 includes an active device array substrate 102, an opposite substrate 104, a first polymer layer 106a, a second polymer layer 106b, and a liquid crystal layer 110.

The opposite substrate 104 is disposed above the active device array substrate 102, and the opposite substrate 104 may be a color filter substrate or a substrate having a common electrode layer 107 only. A material of the active device array substrate 102 and the opposite substrate 104, for example, is glass, plastic, or other materials.

The first polymer layer 106a and the second polymer layer 106b are formed on the opposite substrate 104 and the active device array substrate 102 respectively with the PSA technology. A material of the first polymer layer 106a and the second polymer layer 106b includes high molecular monomers, which are photopolymerized or thermally polymerized. In this embodiment, the polymer layers are disposed on both the active device array substrate 102 and the opposite substrate 104. However, it should be noted that the polymer layer may be disposed only on the active device array substrate 102 or on the opposite substrate 104.

The liquid crystal layer 110 is disposed between the active device array substrate 102 and the opposite substrate 104. The liquid crystal layer 110 has a plurality of liquid crystal molecules, and an arrangement direction of the liquid crystal molecules is substantially parallel to first slits 118a, as shown in FIG. 4.

In this embodiment, in order to achieve a better alignment effect, the liquid crystal display panel 100 further includes a first alignment layer 108a and a second alignment layer 108b. The first alignment layer 108a and the second alignment layer 108b are disposed on the opposite substrate 104 and the active device array substrate 102 respectively, i.e., between the opposite substrate 104 and the polymer layer 106a and between the active device array substrate 102 and the polymer layer 106b respectively. In this embodiment, the alignment layers are disposed on both the opposite substrate 104 and the active device array substrate 102. However, it should be noted that according to actual requirements, in the present invention, the alignment layers may be omitted optionally, or an alignment layer is disposed on the opposite substrate 104 or the active device array substrate 102 only.

Figure 3:
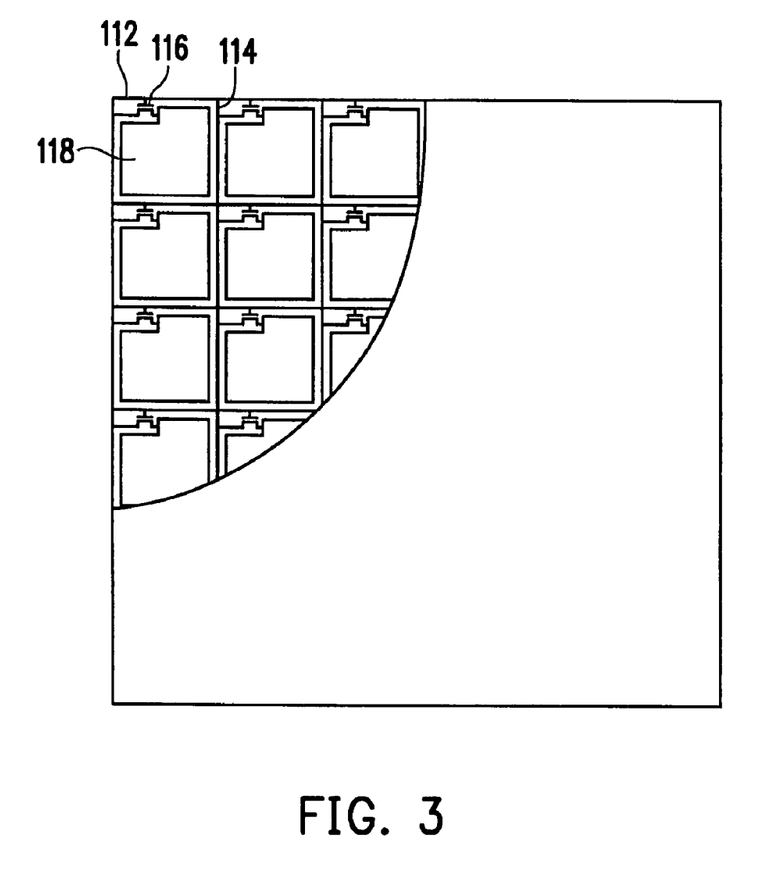
FIG. 3 is a top view of a part of the active device array substrate of the liquid crystal display panel of FIG. 2.
Figure 4:
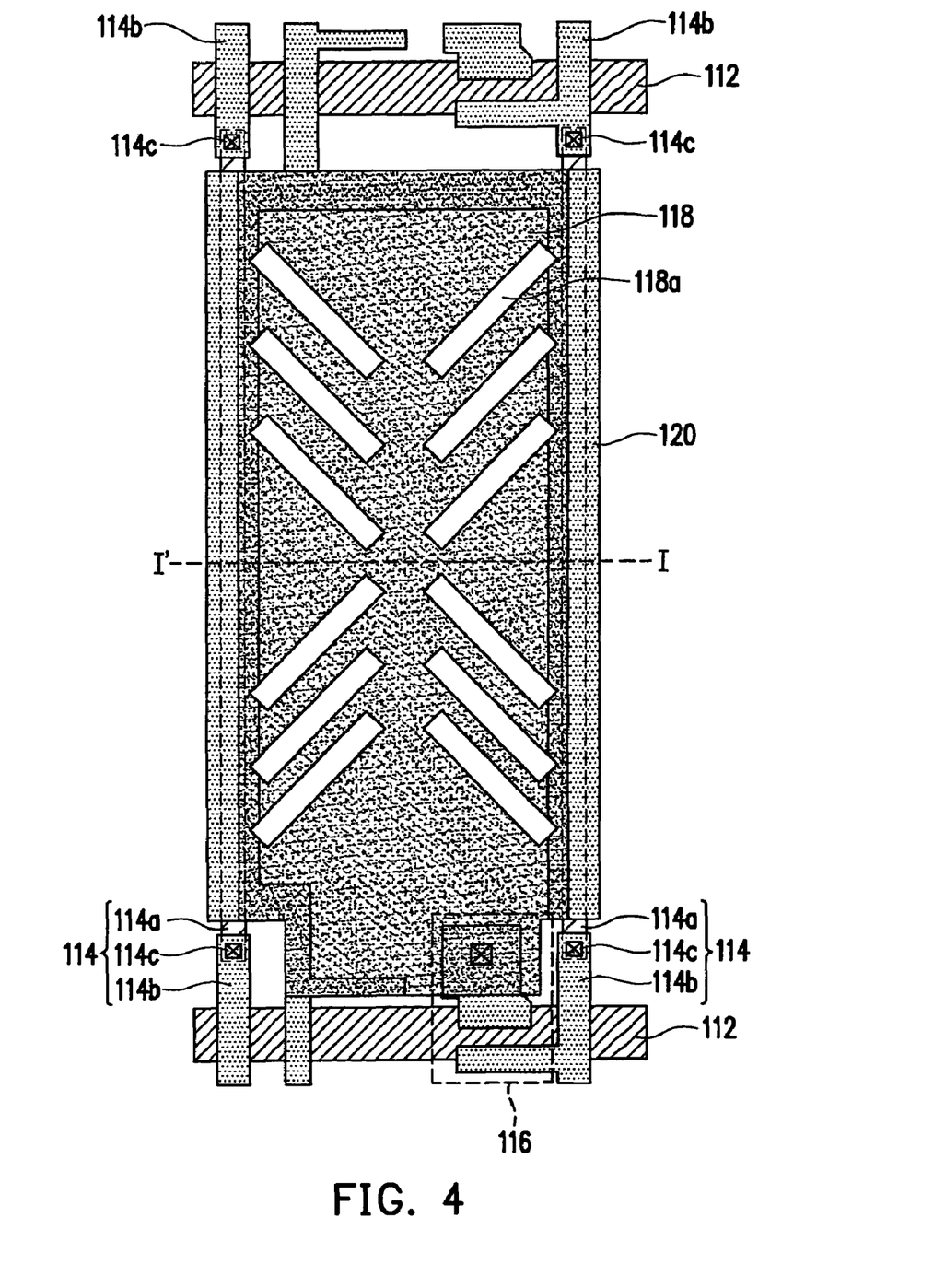
FIG. 4 is a top view showing more details of a pixel unit of FIG. 3.

FIG. 3 is a top view of a part of the active device array substrate of the liquid crystal display panel of FIG. 2, and FIG. 4 shows a pixel unit on the active device array substrate. For the convenience of illustration, film layers that may exist such as the dielectric layer or channel layer are omitted in FIG. 4. However, persons skilled in the art can determine the actual positions and functions of the omitted film layers according to the disclosure of this embodiment and with reference to the prior art. Therefore, the film layers will not be described here.

Referring to FIGS. 3 and 4, the active device array substrate 102 has a plurality of scan lines 112 and data lines 114, a plurality of active devices 116, and a plurality of transparent pixel electrodes 118. The data lines 114 and the scan lines 112 are substantially perpendicular to each other, and are interlaced to form a plurality of pixel units. The material of the scan lines 112 and the data lines 114, for example, is a metal material such as Cr and Ta or other appropriate conductive materials. The active devices 116 are electrically connected to the scan lines 112 and the data lines 114, and are driven by the scan lines 112 and the data lines 114. In this embodiment, the active devices 116, for example, are thin film transistors. Certainly, in other embodiments, the active devices 116 may also be bipolar transistors or other three-terminal active devices. Moreover, the transparent pixel electrodes 118 are electrically connected to the active devices 116, and each of the transparent pixel electrodes 118 has a plurality of first slits 118a, so as to provide different alignment effects. The material of the transparent pixel electrodes 118 may be indium tin oxide (ITO), indium zinc oxide (IZO), or other transparent conductive materials.

In this embodiment, data patterns 114a, the scan lines 112 and gates of the active devices 116, for example, are formed by a same metal layer, and connecting patterns 114b, the common lines 120, and sources and drains of the active devices 116 are formed by another metal layer at an upper position. The data patterns 114a and the connecting patterns 114b are interconnected via contact holes 114c to form the data lines 114. In addition, the common lines 120 are disposed below the transparent pixel electrodes 118 to form storage capacitors. More particularly, the common lines 120 are arranged along edges of the transparent pixel electrodes 118, and a part of the common lines 120 overlap the data patterns 114a. The common lines 120 of this embodiment, for example, surround the pixel electrodes 118, such that the pixel units have an ideal aperture ratio. Certainly, the pattern of the common lines 120 is not limited in the present invention, and the shape of the common lines 120 may vary according to actual situations and design requirements.

Figure 5:
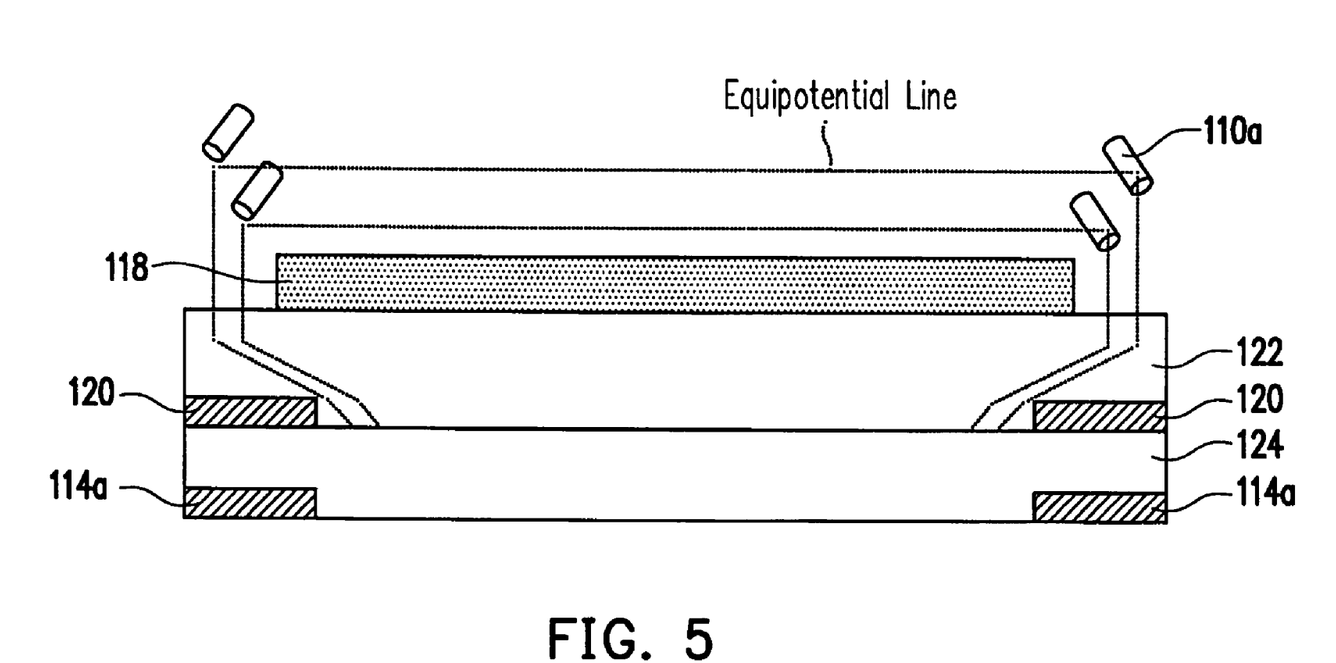
FIG. 5 is a sectional view of FIG. 4 taken along line I-I'.

FIG. 5 is a sectional view of FIG. 4 taken along line I-I'. Referring to FIGS. 4 and 5 together, an insulating layer 124, for example, is disposed between the two metal layers, and covers the data patterns 114a, the scan lines 112, and the gates of the active devices 116. A protective layer 122 is disposed between the upper metal layer and the transparent pixel electrodes 118. The material of the protective layer 122 and the insulating layer 124 includes silicon oxide, silicon nitride, nitrogen-containing silicon oxide, aluminum oxide, or aluminum nitride. It is known from FIG. 5 that the common lines 120 are disposed between the transparent pixel electrodes 118 and the data patterns 114a. When the PSA process is performed to apply an alignment voltage on liquid crystal molecules 110a through the transparent pixel electrodes 118, the common lines 120 can effectively shield the liquid crystal molecules 110a from the interference of the electrical field of the data patterns 114.

Figure 6:
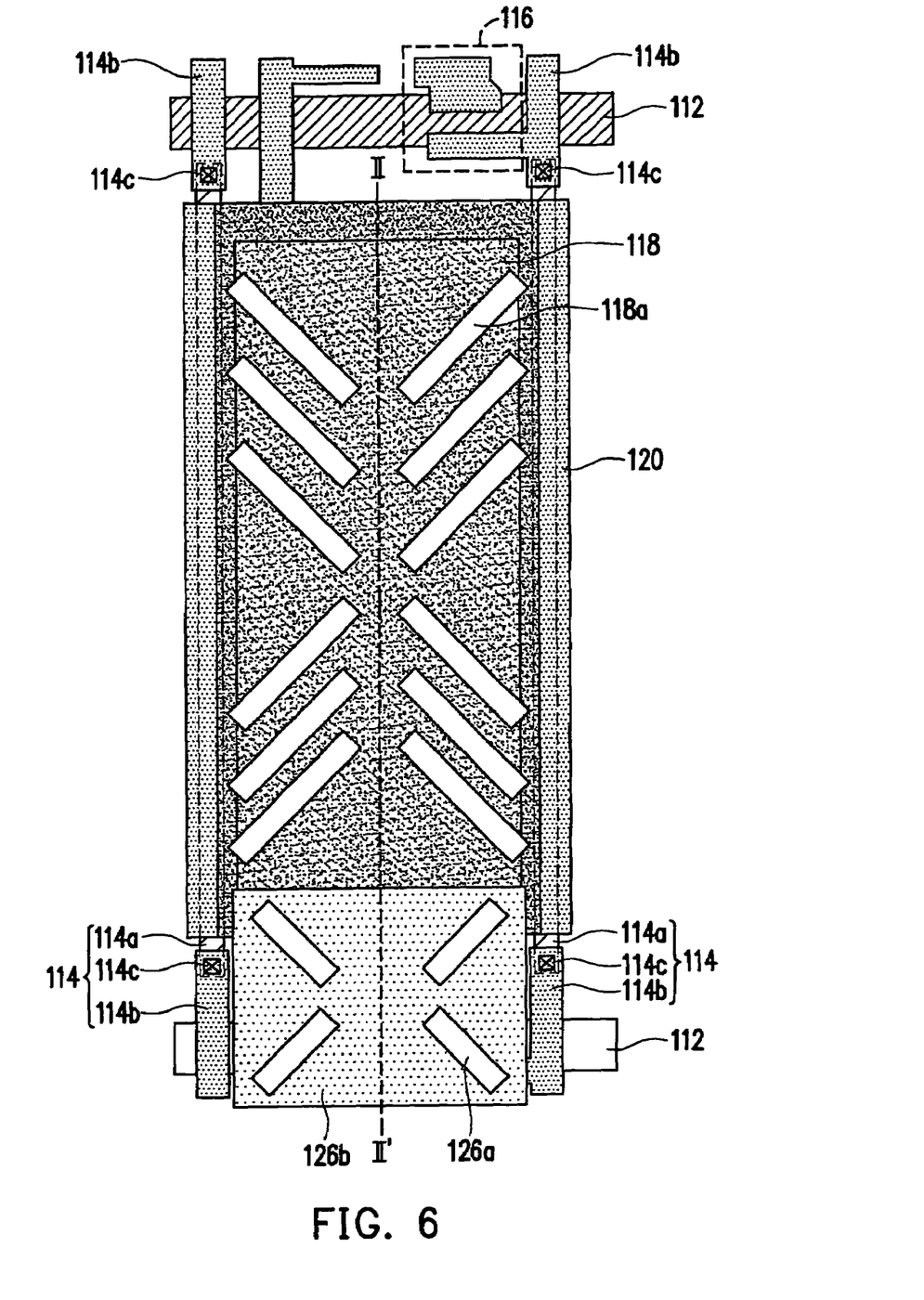
FIG. 6 is a sectional view of a liquid crystal display panel according to another embodiment of the present invention.
Figure 7:
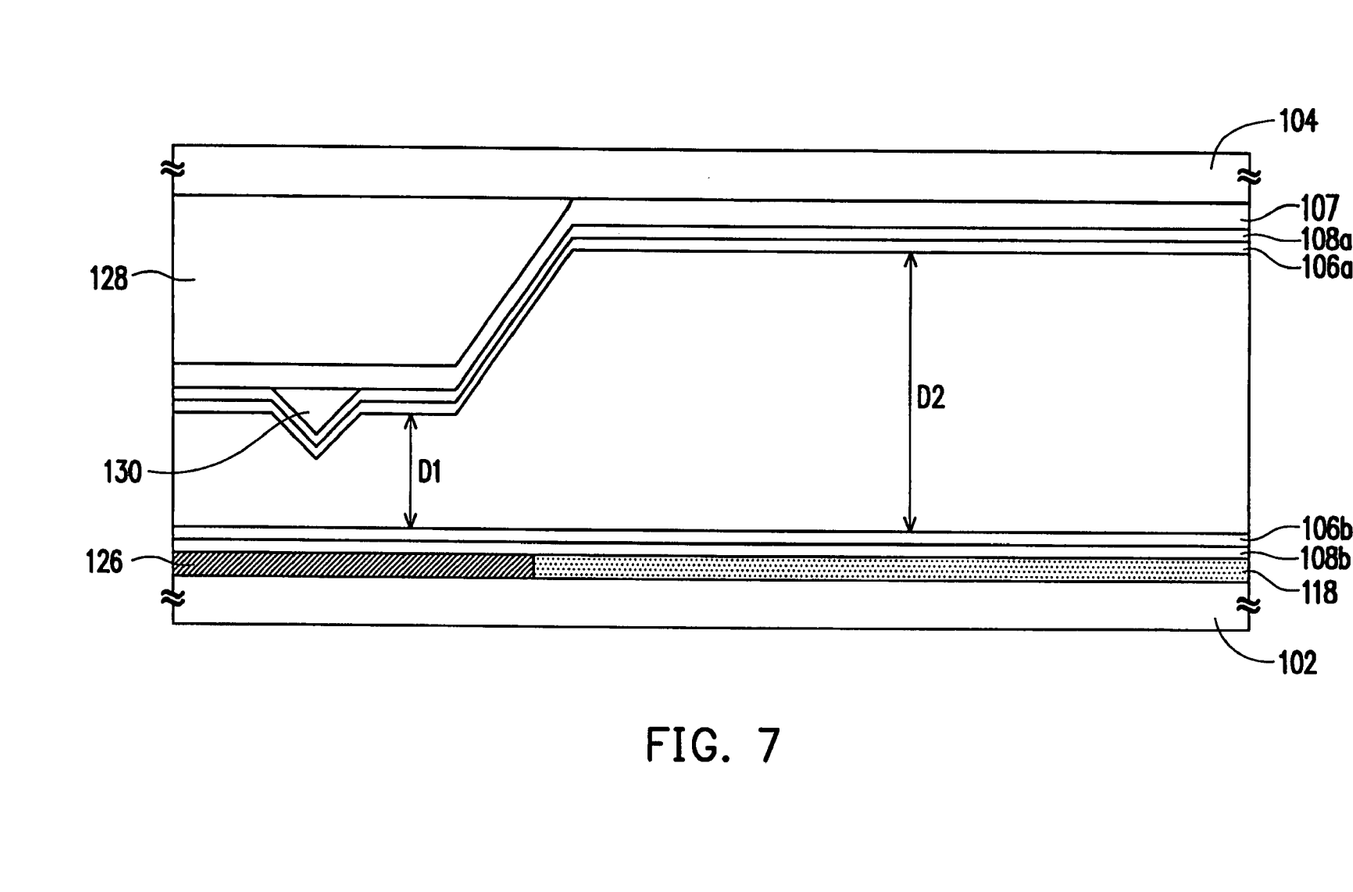
FIG. 7 is a top view of a pixel unit of the liquid crystal display panel of FIG. 6.

In another embodiment, the pixel units may further be applied in a transflective liquid crystal display panel. In other words, the pixel units may further include reflective pixel electrodes. FIG. 6 shows a pixel unit having a reflective pixel electrode according to another embodiment of the present invention, and FIG. 7 is a sectional view of the pixel unit of FIG. 6 taken along line II-II'. Referring to FIGS. 6 and 7, as the pixel unit shown in FIGS. 6 and 7 has similar parts as those of the previous embodiment, and the description on those parts has been provided in the previous embodiment, the similar parts will not described again in this embodiment. As shown in FIGS. 6 and 7, the reflective pixel electrode 126 is electrically connected to an active device 116, and has a plurality of second slits 126a having different extending directions. However, it should be noted that the reflective pixel electrode may not include the slits. The material of the reflective pixel electrode 126 includes aluminum (Al) or other reflective metal materials. Besides, the opposite substrate 104 further includes a plurality of covering layers 128 and a plurality of alignment protrusions 130 (as shown in FIG. 7). The covering layers 128 are corresponding to the reflective pixel electrodes 126, and the alignment protrusions 130 are disposed on the covering layers 128. The material of the covering layers 128 may be a dielectric material or a photoresist material. It should be noted that the alignment protrusions 130 disposed above the corresponding reflective pixel electrodes 126 can realize the alignment function without influencing the aperture ratio. In addition, in order to compensate the display grayscale difference caused by optical path difference between reflective and transmissive areas in the pixel units, different cell gaps D1 and D2 may be disposed between the active device array substrate 102 and the opposite substrate 104. Here, the reflective pixel electrode 126 is corresponding to the cell gap D1, and the transparent pixel electrode 118 is corresponding to the cell gap D2.

Figure 8:
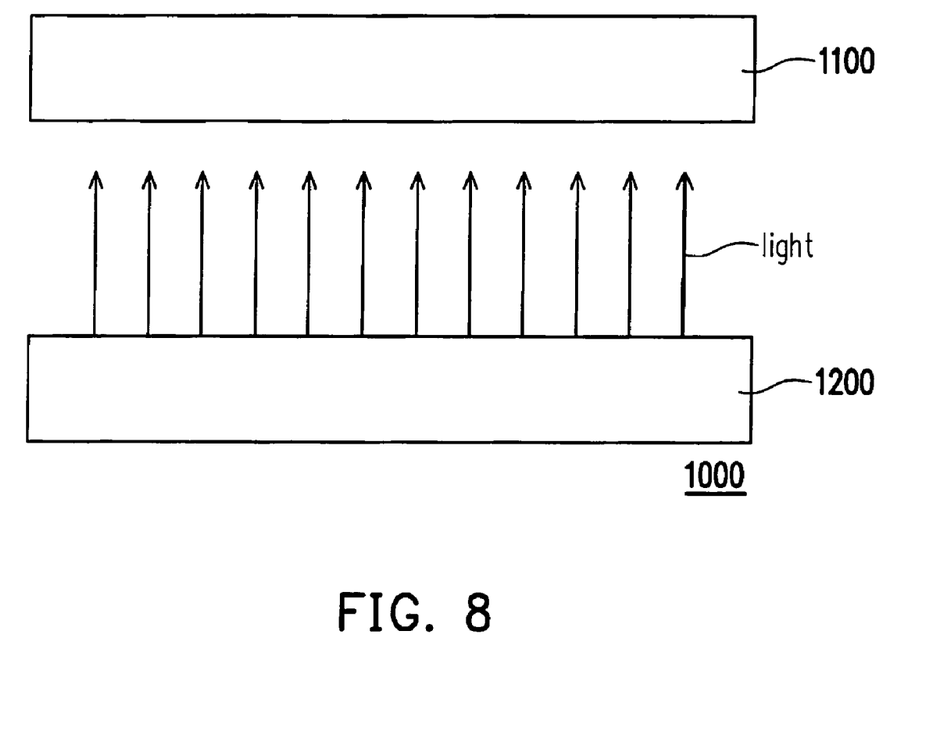
FIG. 8 is a schematic view of a liquid crystal display according to an embodiment of the present invention.

FIG. 8 is a schematic view of a liquid crystal display using the liquid crystal display panel according to an embodiment of the present invention. Referring to FIG. 8, the liquid crystal display 1000 includes a liquid crystal display panel 1100 and a backlight module 1200. The backlight module 1200 is suitable for outputting a surface light source S to the liquid crystal display panel 1100, which functions as the display light source of the liquid crystal display panel 1100. In addition, the structure and the pixel unit design of the liquid crystal display panel 1100 of this embodiment may have different variations as described in the above or other embodiments, and will not be described again here. Moreover, the backlight module 1200 may be a direct type backlight module or a side incident type backlight module, and the light source of the backlight module 1200 may be a cold cathode fluorescence lamp (CCFL), a light emitting diode (LED), or other appropriate light sources.

To sum up, the liquid crystal display panel and the liquid crystal display of the present invention have the common line structure, and a part of each common line overlaps the data patterns of the data lines, so as to shield the liquid crystal molecules from the interference of the electrical field of the data lines. Therefore, when a voltage is applied on the liquid crystal molecules in the PSA process, the liquid crystal molecules will incline along the direction of the slits of the pixel electrodes due to a strong fringing field. Thus, better liquid crystal arrangement is achieved, and the response time, contrast and display quality of the liquid crystal display can be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display panel, comprising:
   an active device array substrate;
   an opposite substrate, disposed above the active device array substrate;
   a plurality of scan lines, disposed on the active device array substrate;
   a plurality of data patterns, disposed on the active device array substrate;
   a plurality of connecting patterns, disposed on the active device array substrate, and forming a plurality of data lines with the data patterns via a plurality of contact holes;
   a plurality of active devices, wherein each of the active devices is electrically connected to one of the scan lines and one of the data lines;
   a plurality of transparent pixel electrodes, wherein each of the transparent pixel electrodes is electrically connected to one of the active devices, and has a plurality of first slits;
   a plurality of common lines, disposed between the transparent pixel electrodes and the data lines, wherein a part of each common line overlaps the corresponding data pattern;
   at least one polymer layer, disposed on at least one of the active device array substrate and the opposite substrate; and a liquid crystal layer, disposed between the active device array substrate and the opposite substrate, and having a plurality of liquid crystal molecules.

2. The liquid crystal display panel as claimed in claim 1, further comprising a protective layer disposed between the common lines and the transparent pixel electrodes.

3. The liquid crystal display panel as claimed in claim 1, further comprising at least one alignment layer disposed between the surface of the active device array substrate and the polymer layer and/or between the surface of the opposite substrate and the polymer layer.

4. The liquid crystal display panel as claimed in claim 1, wherein a material of the polymer layer comprises high molecular monomers, and the high molecular monomers are photopolymerized or thermally polymerized.

5. The liquid crystal display panel as claimed in claim 1, wherein the first slits have different extending directions.

6. The liquid crystal display panel as claimed in claim 1, wherein an arrangement direction of the liquid crystal molecules is substantially parallel to the first slits.

7. The liquid crystal display panel as claimed in claim 1, further comprising a plurality of reflective pixel electrodes, each electrically connected to one of the active devices.

8. The liquid crystal display panel as claimed in claim 7, wherein each reflective pixel electrode has a plurality of second slits.

9. The liquid crystal display panel as claimed in claim 7, wherein the opposite substrate comprises a plurality of alignment protrusions disposed above the reflective pixel electrodes.

10. The liquid crystal display panel as claimed in claim 7, wherein the reflective pixel electrodes and the transparent pixel electrodes are corresponding to different cell gaps.

11. A liquid crystal display, comprising:
a backlight module; and
a liquid crystal display panel, disposed above the backlight module, the liquid crystal display panel comprising:
an active device array substrate;
an opposite substrate, disposed above the active device array substrate;
a plurality of scan lines, disposed on the active device array substrate;
a plurality of data patterns, disposed on the active device array substrate;
a plurality of connecting patterns, disposed on the active device array substrate, and forming a plurality of data lines with the data patterns via a plurality of contact holes;
a plurality of active devices, wherein each of the active devices is electrically connected to one of the scan lines and one of the data lines;
a plurality of transparent pixel electrodes, wherein each of the transparent pixel electrodes is electrically connected to one of the active devices, and has a plurality of first slits;
a plurality of common lines, disposed between the transparent pixel electrodes and the data lines, wherein a part of each common line overlaps the corresponding data pattern;
at least one polymer layer, disposed on at least one of the active device array substrate and the opposite substrate; and
a liquid crystal layer, disposed between the active device array substrate and the opposite substrate, and having a plurality of liquid crystal molecules.

12. The liquid crystal display as claimed in claim 11, wherein the liquid crystal display panel further comprises a protective layer disposed between the common lines and the transparent pixel electrodes.

13. The liquid crystal display as claimed in claim 11, wherein the liquid crystal display panel further comprises at least one alignment layer disposed between the surface of the active device array substrate and the polymer layer and/or between the surface of the opposite substrate and the polymer layer.

14. The liquid crystal display as claimed in claim 11, wherein a material of the polymer layers comprises high molecular monomers, and the high molecular monomers are photopolymerized or thermally polymerized.

15. The liquid crystal display as claimed in claim 11, wherein the first slits have different extending directions.

16. The liquid crystal display as claimed in claim 11, wherein an arrangement direction of the liquid crystal molecules is substantially parallel to the first slits.

17. The liquid crystal display as claimed in claim 11, wherein the liquid crystal display panel further comprises a plurality of reflective pixel electrodes, each electrically connected to one of the active devices.

18. The liquid crystal display as claimed in claim 17, wherein each reflective pixel electrode has a plurality of second slits.

19. The liquid crystal display as claimed in claim 17, wherein the opposite substrate comprises a plurality of alignment protrusions disposed above the reflective pixel electrodes.

20. The liquid crystal display as claimed in claim 17, wherein the reflective pixel electrodes and the transparent pixel electrodes are corresponding to different cell gaps.

* * * * *